United States Patent Office 3,033,846
Patented May 8, 1962

3,033,846
COPPER COMPLEX COMPOUNDS OF POLYAZO DYESTUFFS
Albert Demagistri, Binningen, near Basel, Hans Ischer, Basel, and Walter Wehrli, Riehen, near Basel, Switzerland, assignors to Sandoz Ltd., Basel, Switzerland
No Drawing. Filed Dec. 5, 1958, Ser. No. 778,313
Claims priority, application Switzerland Mar. 13, 1956
6 Claims. (Cl. 260—145)

The present application is a continuation-in-part of the application Ser. No. 643,237, filed March 1, 1957, now abandoned, and relates to copper containing polyazo dyestuffs of the formula

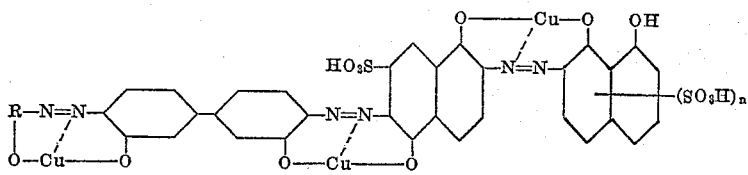

(I)

wherein R—O represents the radical of a coupling component of the monohydroxy benzene, of the monohydroxy naphthalene or 1-aryl-5-pyrazolone series coupled in ortho-position to —O— and $n$ represents one of the integers 1 and 2, the dyestuff molecule containing at least three sulfonic acid groups.

The process for the production of the copper containing polyazo dyestuffs consists in coupling 1 mol of the tetrazo compound of 4.4'-diamino-3.3'-dimethoxy-1.1'-diphenyl in either order with 1 mol of a monoazo dyestuff, if desired in the form of its copper complex compound, having the general formula

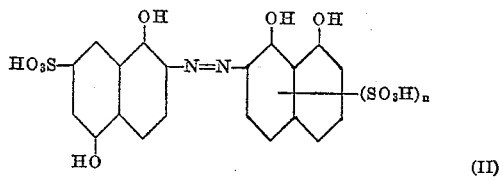

(II)

wherein $n$ has the previously defined meaning, and with 1 mol of the same azo component or with 1 mol of a hydroxybenzene, a hydroxynaphthalene or a 1-aryl-5-pyrazolone coupling in ortho-position to a phenolic or enolic hydroxy group and treating subsequently the polyazo dyestuff so formed which must contain at least three sulfonic acid groups, in substance with a copper-yielding agent.

The monoazo dyestuffs of general Formula II employed in the coupling reaction are applied preferably in the form of their copper complex compounds. They may be coupled either in the first or second instance with the tetrazotized 4.4'-diamino-3.3'-dimethoxy-1.1'-diphenyl. The coupling components corresponding to the radical R—OH are preferably a monoazo dyestuff H—Z—OH, if desired in the decopperized or uncoppered form of the Formula II, a hydroxybenzene, a hydroxynaphthalenemono-, -di- or -trisulfonic acid, a dihydroxynaphthalenemono- or disulfonic acid, an acylaminohydroxynaphthalenesulfonic acid or a 1-aryl-5-pyrazolone which may be sulfonated in the aromatic nucleus. The coupling reactions are conducted in an alkaline, preferably soda alkaline, medium; the second coupling reaction may be carried out with the addition of pyridine or a mixture of pyridine bases.

The coppering of the new polyazo dyestuffs in substance is carried out in such a way as to cause splitting of any alkoxy groups which may be present. Examples of suitable copper-yielding agents are copper sulfate, copper acetate and copper formate.

The dyestuffs can be coppered, for example, by heating with copper salts in a weakly acid to alkaline medium, if desired with pressure and/or in the presence of ammonia or organic bases, or in the suspension of an alkali metal salt of a low molecular aliphatic monocarboxylic acid.

The copper-containing polyazo dyestuffs dye cotton and fibers of regenerated cellulose in very level blue-gray to green-gray shades. The building-up properties on these fibers can easily be regulated by gradual addition of salts such as sodium sulfate, chloride or carbonate, or by mixture of such salts. In other words, the dyestuffs possess excellent salt-controllability, by virtue of which level, well penetrated dyeings are obtained, e.g. on crosswound yarn packages, and shading with other dyestuffs is facilitated. The new dyestuffs also give penetrated dyeings on dead cotton.

The fastness properties obtained with the new dyestuffs are excellent. The dyeings on natural and regenerated cellulose fibers show very good fastness to light and to wet treatments such as washing, water, perspiration, sea water, wet pressing, water spotting, etc. In addition they are readily dischargeable and fast to scrooping, formaldehyde, alkalis and acids. The new dyestuffs give a very good reserve of cellulose acetate, wool, silk, nylon, Perlon, acrylic and polyester fibers. They show no appreciable change of shade on aftertreatment with resin crease-resisting agents and the dyeings retain excellent light and wet fastness properties after such finishing. The fastness to gas fume fading is also very good. The dyestuffs are insensitive to lime and only very slightly sensitive to the metals iron, copper and chromium. The fastness properties can be further improved by aftertreating the dyeings with a polyalkylene polyamine in presence of a copper salt or with a polyalkylene-polyamine containing copper in complex combination.

The following examples illustrate the invention. The parts and percentages specified therein are by weight and the temperatures are in degrees centigrade.

Example 1

24.4 parts of 4.4'-diamino-3.3'-dimethoxy-1.1'-diphenyl are suspended in 150 parts of water, 54 parts of concentrated hydrochloric acid and 150 parts of ice. To the suspension at 0–2° is added a solution of 13.8 parts of sodium nitrite in 50 parts of water. A solution of 34.8 parts of sodium 1-hydroxynaphthalene-3.6-disulfonate and 50 parts of water is poured into the so-formed tetrazo solution at 0–5° to give the intermediate diazomonoazo compound. Upon the addition of a solution of 6 parts of soda in 30 parts of water the one-sided coupling reaction to give the diazomonoazo compound takes place easily and quantitatively. The final coupling reaction is effected by adding to the solution of the intermediate compound at 5–10° a solution of 58.6 parts of the monoazo compound of general formula

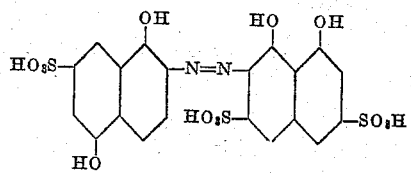

in 700 parts of pyridine and 700 parts of water. The resultant mixture at 10–12° is given 100 parts of concentrated ammonia. On completion of coupling the trisazo dyestuff thus formed is salted out from the solution and filtered off. It corresponds to the formula

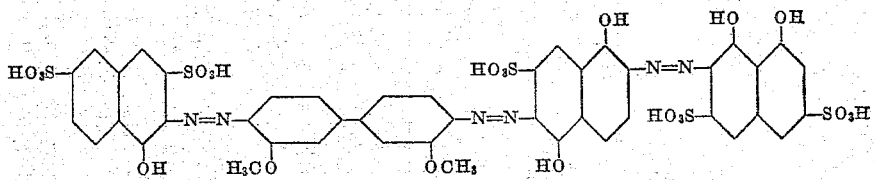

For the purpose of demethylating and coppering, the filter cake of the trisazo dyestuff is stirred into 4000 parts of water, and 50 parts of diethanolamine are added to the suspension, which is then heated to 80°. At 80–90° the suspension is fed in the course of 30 minutes with a solution of 75 parts of crystallized copper sulfate and 105 parts of concentrated ammonia in 450 parts of water, and the trisazo dyestuff thus brought into solution. Mechanical stirring of the solution at 95–97° is maintained for a further 20 hours. After this time the copper-containing trisazo dyestuff so formed is salted out from the solution, filtered off and dried. It is a dark powder which dissolves in water with a blue coloration and in concentrated sulfuric acid with a blue-green coloration; it dyes cotton and fibers of regenerated cellulose in blue-gray shades fast to light, washing, perspiration.

0.1 part of the copper-containing trisazo dyestuff is dissolved in 300 parts of lime-free water. 10 parts of wetted cotton fabric are introduced into this liquor at 30°, which is then heated to 100° over a period of 30 minutes. Dyeing is continued at this temperature for 15 minutes. In the course of the dyeing process a 10% aqueous solution of 3–4 parts of sodium sulfate is added to the dyeliquor in portions. After the prescribed dyeing time the cloth is left in the liquor for 15 to 20 minutes till the temperature has fallen to 50°, then removed, rinsed with water, centrifuged and dried. Upon after treatment with a basic, cation-active copper complex compound the wet fastness properties of the dyed cotton show a marked improvement.

*Example 2*

31.7 parts of 4.4′-diamino-3.3′-dimethoxy-1.1′-diphenyl dihydrochloride are stirred into a mixture of 250 parts of water, 35.5 parts of concentrated hydrochloric acid and 150 parts of ice. A solution of 13.8 parts of sodium nitrite and 50 parts of water is added to the suspension at 2° and the mixture stirred until tetrazotizing is completed. To produce the intermediate compound the tetrazo solution at 5° is given a solution of 64.7 parts of the copper complex compound of the monoazo dyestuff of general formula

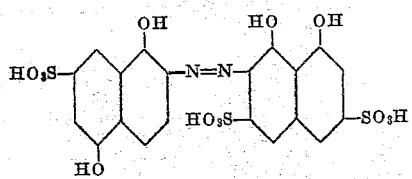

in 350 parts of water, 15 parts of caustic soda 30% and 50 parts of a 20% soda solution. Following this, a further 75 parts of a 20% soda solution are added to the coupling mixture. The one-sided coupling reaction ensues easily and quantitatively.

The final coupling reaction is carried out by adding to the solution of the intermediate product a solution of 33.4 parts of 1-phenyl-3-methyl-5-pyrazolone-2′.4′ - disulfonic acid in 150 parts of water and 100 parts of a 20% soda solution. When the coupling reaction is completed the so-formed trisazo dyestuff is salted out and filtered off.

The demethylating and coppering of the trisazo dyestuff is conducted in a manner similar to that described in the first example. The copper-containing trisazo dyestuff is a dark powder which dissolves in water with a blue-gray coloration, and dyes cotton and fibers of regenerated cellulose in gray shades fast to light, washing, perspiration.

In the table which follows further copper-containing polyazo dyestuffs are enumerated which can be produced according to the particulars of Example 1. For their characterization the table contains in column (B) the 1.8-dihydroxynaphthalene-mono- or -disulfonic acid of the azo component of Formula II; in column (C) the second azo component is named, and in column (D) the shade obtained with the respective copper-containing polyazo dyestuff on cotton is indicated.

| (A) Example No. | (B) 1.8-Dihydroxynaphthalenesulfonic acid | (C) Second Azo Component | (D) Shade of the Copper-Containing Dyestuff on Cotton |
|---|---|---|---|
| 3 | 1.8-Dihydroxynaphthalene-3.6-disulfonic acid. | 1-Hydroxynaphthalene-3.8-disulfonic acid. | blue-gray. |
| 4 | 1.8-Dihydroxynaphthalene-3-sulfonic acid. | 2-Hydroxynaphthalene-3.6-disulfonic acid. | Do. |
| 5 | 1.8-Dihydroxynaphthalene-3.6-disulfonic acid. | 2-Hydroxynaphthalene-4-sulfonic acid. | Do. |
| 6 | 1.8-Dihydroxynaphthalene-4-sulfonic acid. | 1-Hydroxynaphthalene-3,6,8-trisulfonic acid. | Do. |
| 7 | 1.8-Dihydroxynaphthalene-3.6-disul- | 2-Benzoylamino-5-hydroxynaphthalene-7-sulfonic acid | gray-blue. |
| 8 | 1.8-Dihydroxynaphthalene-3-sulfonic acid. | 1-Phenyl-3-methyl-5-pyrazolone-3′-sulfonic acid. | gray. |
| 9 | 1.8-Dihydroxynaphthalene-3.6-disulfonic acid. | 1-Naphthyl(2′)-3-methyl-5-pyrazolone-6′-sulfonic acid. | Do. |
| 10 | do | 1-Phenyl-3-methyl-5-pyrazolone-2′-sulfonic acid. | Do. |
| 11 | 1.8-Dihydroxynaphthalene-4-sulfonic acid. | 1-Phenyl-3-methyl-5-pyrazolone-4′-sulfonic acid. | Do. |
| 12 | 1.8-Dihydroxynaphthalene-3.6-disulfonic acid. | 1-Phenyl-3-methyl-5-pyrazolone-3′-carboxylic acid. | Do. |
| 13 | do | 1-Phenyl-5-pyrazolone-3-carboxylic acid. | Do. |
| 14 | do | 1.5-Dihydroxy-2-(1′ 8′-dihydroxy)-naphthyl(2′)-azonaphthalene-7.3′.6′-trisulfonic acid. | gray-blue. |
| 15 | do | 1.5-Dihydroxy-2-(1′ 8′-dihydroxy)-naphthyl(2′)-azonaphthalene-7.3′-disulfonic acid. | Do. |
| 16 | do | 1.5-Dihydroxy-2-(1′, 8′-dihydroxy)-naphthyl(2′)-azonaphthalene-7.4′-disulfonic acid. | Do. |
| 17 | 1.8-Dihydroxynaphthalene-4-sulfonic acid. | do | gray. |
| 18 | 1.8-Dihydroxynaphthalene-3-sulfonic acid. | do | Do. |
| 19 | 1.8-Dihydroxynaphthalene-3.6-disulfonic acid. | 1-Hydroxy-4-methylbenzene. | Do. |
| 20 | do | 1-Hydroxy-2-acetylamino-4-methylbenzene. | Do. |
| 21 | do | 1-Hydroxy-2-sulfoacetylamino-4-methylbenzene. | Do. |

Formulae of representative dyestuffs of the foregoing examples are as follows.
Example 1:
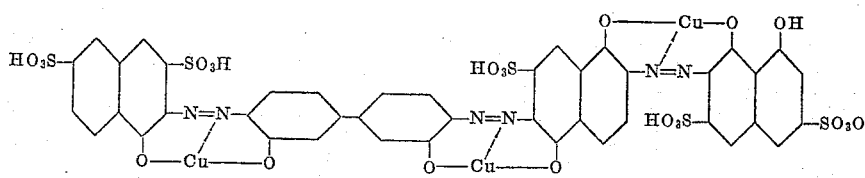
Example 2:
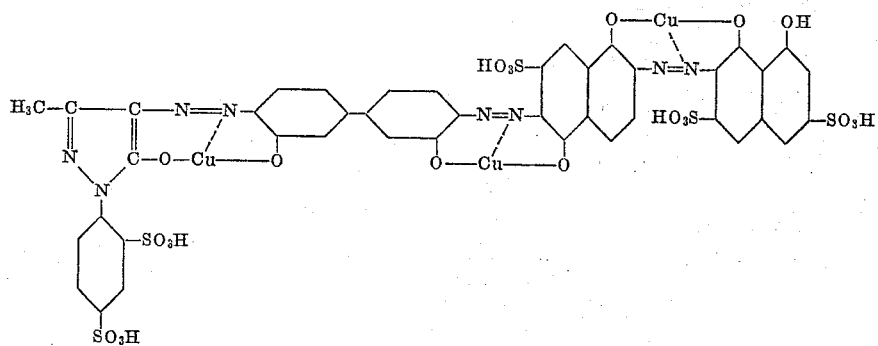
Example 4:
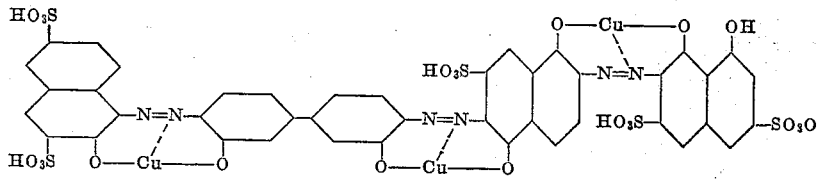
Example 5:
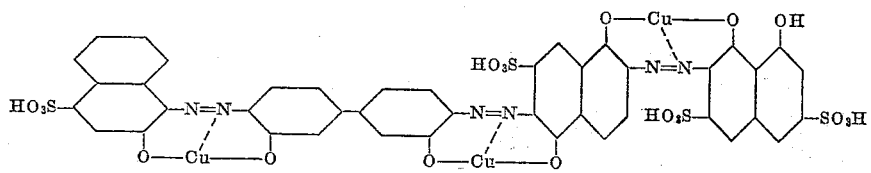
Example 8:
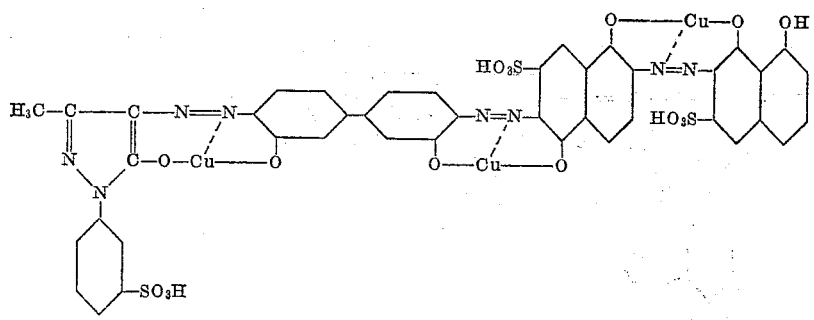

Example 14:

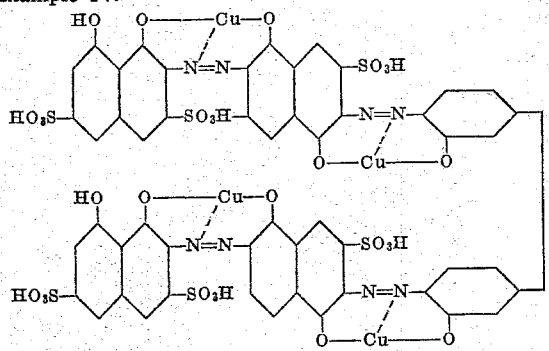

Having thus disclosed the invention, what we claim is:

1. A copper-containing trisazo dyestuff of the formula

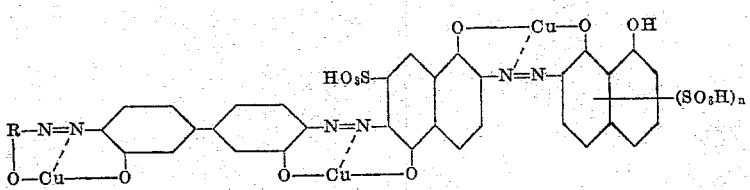

wherein R—O represents a member selected from the group consisting of (a) the radical of 1-hydroxy-4-methylbenzene and 2-acetylamino derivatives thereof coupled in ortho-position to —O—, (b) the radical of a coupling component selected from the group consisting of the monohydroxynaphthalene series containing up to three sulfonic acid groups, and a benzolyaminomonohydroxynaphthalene monosulfonic acid, said radical being coupled in ortho-position to —O— and (c) the radical of a coupling component selected from the group consisting of the 1-phenyl-5-pyrazolone series and the 1-naphthyl-5-pyrazolone series coupled in ortho-position to —O—; and $n$ is a positive whole number of at most 2, there being at least three sulfonic acid groups in the dyestuff molecule.

2. The copper-complex dyestuff which corresponds to the formula

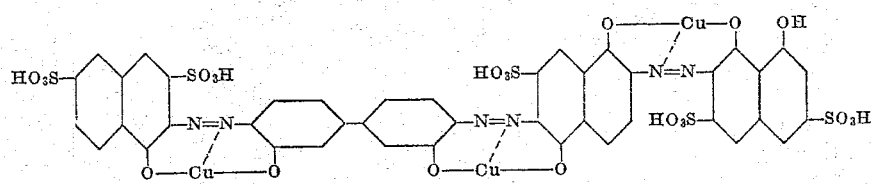

3. The copper-complex dyestuff which corresponds to the formula

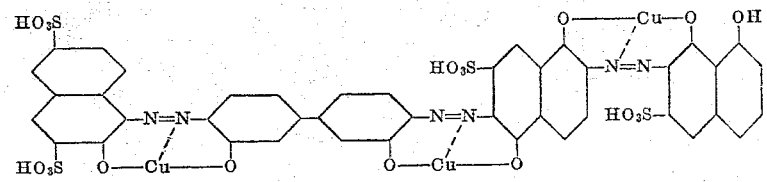

4. The copper-complex dyestuff which corresponds to the formula

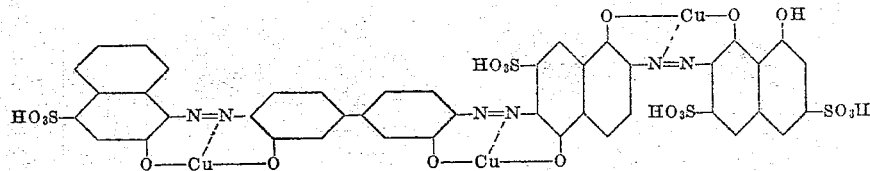

5. The copper-complex dyestuff which corresponds to the formula

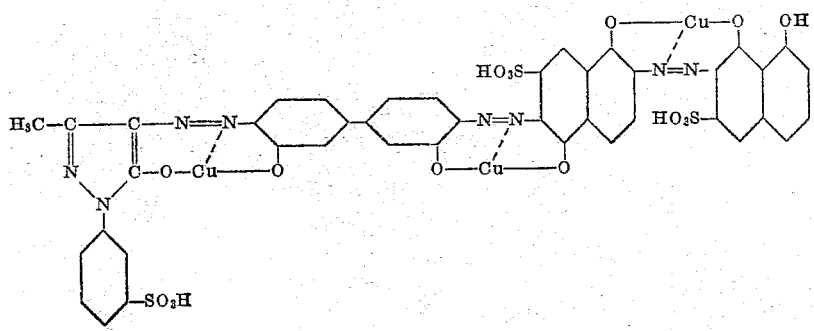

6. The copper-complex dyestuff which corresponds to the formula
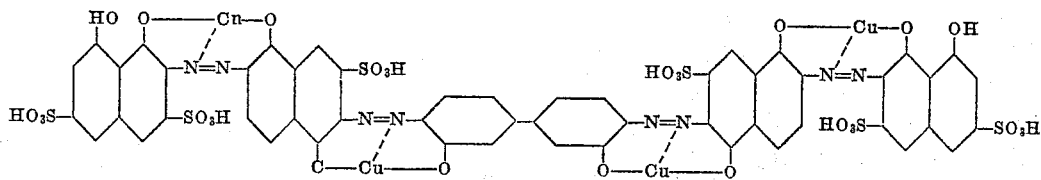
References Cited in the file of this patent
UNITED STATES PATENTS
2,644,813    Ruckstuhl et al. ---------- July 7, 1953

UNITED STATES PATENT OFFICE
CERTIFICATE OF CORRECTION

Patent No. 3,033,846            May 8, 1962

Albert Demagistri et al.

It is hereby certified that error appears in the above numbered patent requiring correction and that the said Letters Patent should read as corrected below.

Column 1, line 31, for "-1.'-" read -- -1.1'- --; columns 5 and 6, lower right-hand portion of the formulae in Examples 1 and 4, for "—$SO_3O$", each occurrence, read -- —$SO_3H$ --; column 8, lines 5 and 6, for "benzolyaminomonohydroxynaphthalene" read -- benzoylaminomonohydroxynaphthalene --.

Signed and sealed this 20th day of November 1962.

(SEAL)
Attest:

ERNEST W. SWIDER            DAVID L. LADD
Attesting Officer            Commissioner of Patents